Jan. 19, 1960
C. E. BACON
2,922,058
GENERATOR SLOT WEDGE ASSEMBLY
Filed Jan. 2, 1958
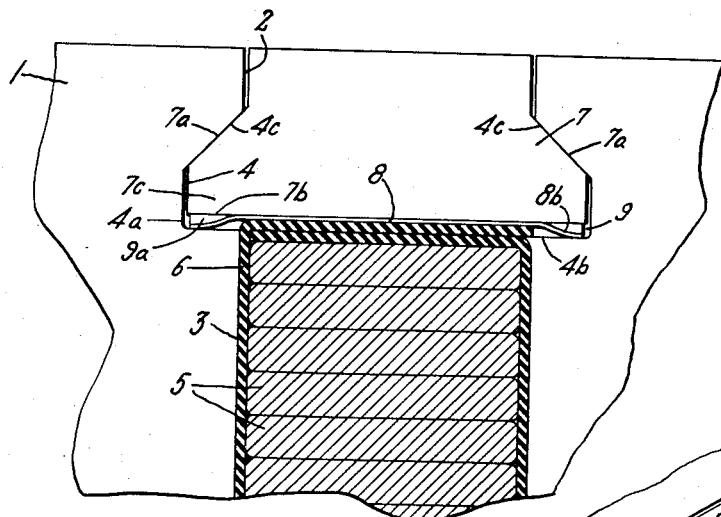
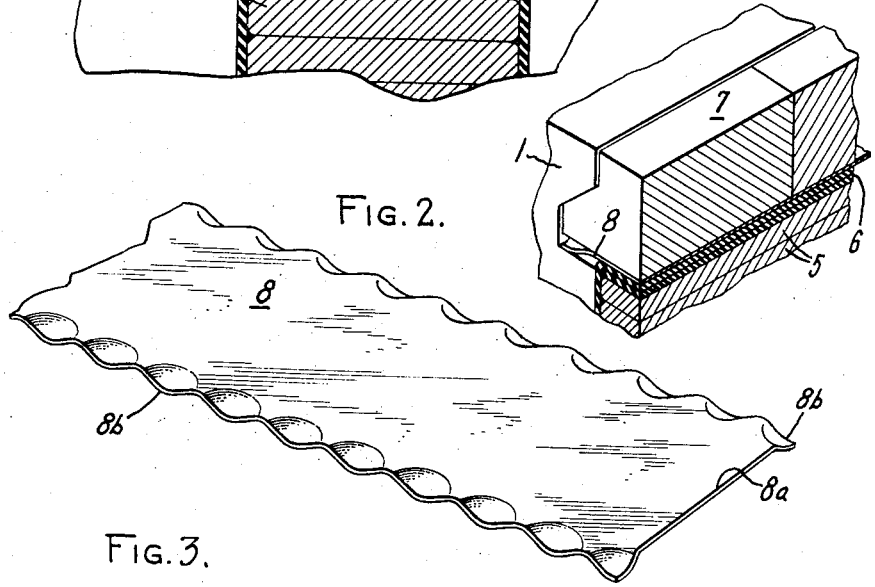
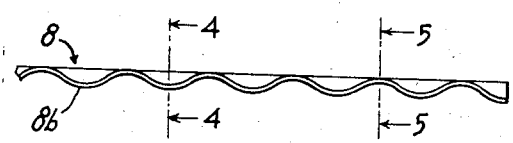
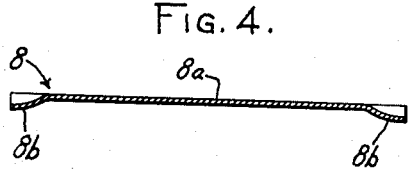
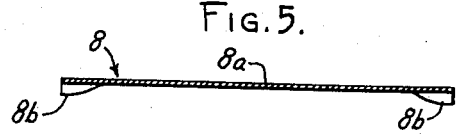
INVENTOR.
CARL E. BACON
BY
HIS ATTORNEY

United States Patent Office 2,922,058
Patented Jan. 19, 1960

2,922,058

GENERATOR SLOT WEDGE ASSEMBLY

Carl E. Bacon, Lynnfield, Mass., assignor to General Electric Company, a corporation of New York Application January 2, 1958, Serial No. 706,777

5 Claims. (Cl. 310—214)

This invention relates to a slot wedge assembly for a dynamoelectric machine, particularly to a slot wedge for retaining a winding element in a winding slot of a dynamoelectric machine core member.

Conventionally, a coil located in the slot portion of a generator rotor or stator is maintained in place by wedges located end-to-end and dovetailed against radial movement. These wedges are very carefully fitted to obtain the tight fit necessary to prevent axial displacement or rattling of the wedges. This requires costly measuring and machining processes, particularly in the case of a generator rotor where the wedges are subject to high centrifugal forces. A tight fitting wedge in a rotor core is particularly desirable since if the wedges are loose they could upset the "balance" characteristics of the rotor. When the wedges are tightly fitted in the core member by precise machining they are difficult to install and very often cannot be used over again. It can thus be appreciated that if the wedges could be tightly fitted in place without the precise fitting methods now used, a substantial cost reduction could be realized due to reduced machining costs since very close tolerances are no longer required.

Accordingly, it is an object of this invention to provide a slot wedge assembly in which the wedge is maintained tightly in place without the necessity of "hand-fitting" each wedge to exactly match the wedge slot portion.

It is a further object to provide a wedge assembly in which the wedges can be readily installed and removed without damaging them.

Other objects and advantages will become apparent from the following description taken in connection with the accompanying drawings in which—

Fig. 1 is a partial sectional view showing the wedge mounted in place;

Fig. 2 is a view of the resilient means used for maintaining the slot wedge in place;

Fig. 3 is a side view of the spring member disclosed in Fig. 2;

Fig. 4 is a section taken along the line 4—4 of Fig. 3;

Fig. 5 is a section taken along the lines 5—5 of Fig. 3; and

Fig. 6 is a perspective view of a section through the wedge.

Generally stated, in accordance with the invention the wedges of a dynamoelectric machine core member are maintained tightly fitted in the wedge receiving slot portion of the core member by special resilient means biasing the wedges into positive contact with the engaging surfaces of the wedge receiving slot portion.

Referring now to Fig. 1, there is illustrated a rotor 1 having a slot 2 extending the full axial length of the rotor and consisting of a winding receiving portion 3 and a dovetail wedge receiving portion 4. Located in the winding slot portion 3 is a plurality of coils 5 surrounded by slot insulation 6, the upper surface of which extends radially into wedge receiving slot 4. Coils 5 are retained in slot 3 by wedges 7 provided with tapered or dovetail side faces 7a which engage similarly tapered walls 4c of slot 4. Wedges 7 are located end-to-end the full axial length of wedge receiving slot 4. The cross-section of wedge 7 in the radial plane is substantially identical to but slightly smaller than wedge slot 4 to permit ready insertion of wedge 7. Thus when desired, the wedge 7 can be readily removed and replaced without damage thereto. When wedge 7 is in place, an axially extending space 9 is formed between the inner surface 7b of wedge 7, insulation 6, and slot walls 4a, 4b for receiving a spring 8. Spring 8, which will be described in detail hereinafter, biases wedge 7 outwardly so that the sloped wedge surfaces 7a are in tight frictional engagement with corresponding slot walls 4c. Thus any errors in machining or nonparallelism of surface contact between the wedge surfaces 7a and the walls 4c of the wedge receiving slot 4 is compensated for by spring 8. Wedge 7, when finally positioned in slot 4 by spring 8 retains winding 5 in slot 3 against the high centrifugal forces existing during rotor operation. The outer surface of wedge 7 is made flush with the outer surface of rotor 1 to reduce windage losses.

In the particular illustrated embodiment of my invention, wedge 7 is maintained in tight frictional engagement with rotor 1 by spring 8 located in space 9 and extending the full axial length of rotor 1. As can be seen more particularly in Figs. 2–5, spring 8 comprises a flat central portion 8a located between wedge 7 and coil insulation 6, and edge portions 8b which are corrugated are "dimpled" throughout their full axial length. The corrugations 8b are located in shallow clearance spaces 9a formed between wedge dovetail portions 7c and the slot bottom surface 4b. The corrugations 8b, before insertion of wedge 7, have a greater depth than recesses 9a, so that when wedge 7 is inserted, the corrugations 8b are deflected (to a degree within their elastic limit) to provide a resilient biasing force outwardly against wedge 7. By corrugating only the side portions (instead of extending the corrugations transversely across spring 8) a larger force per unit of deflection is obtained, because longitudinal extension of the corrugations 8b is restrained by the flat central portion 8a, which is placed in tension when the total height of the spring member is reduced by the compression occurring when the wedges 7 are inserted. Spring 8 thus maintains wedge surfaces 7a in tight frictional contact with the slot walls 4c to prevent rattling or displacement of the wedge.

It is important to note that spring 8, in addition to maintaining wedge 7 tightly in place, serves as a chafing strip" to prevent damage to insulation 6 when the wedges are installed. This has previously been accomplished by using a separate chafing strip made of fibrous material of a type which had to be made much thicker than the thin metal spring 8. Thus for a given slot depth, a greater volume is available for the conductors 5. Furthermore, as indicated in Fig. 6, spring 8 is made as a continuous metal strip that extends the full axial length of slot 2. Spring 8 thus prevents the insulation 6 from being "extruded" into the clearance spaces between adjacent ends of the slot wedges if they become separated slightly, when the windings 5 are forced outwardly thereagainst by the high centrifugal forces imposed during operation.

The spring 8 and wedge 7 are normally made of steel, which can be either magnetic or non-magnetic, depending on the flux distribution required. However, with the aid of the invention, wedge 7 could be made of a suitable non-metallic material such as a molded polyester-glass laminate. In the case of the spring 8, the cross-section area thereof is so small that the flux distribution therein makes it relatively unimportant what the magnetic properties of the spring material are.

As an example, a typical spring in accordance with the invention might be cold-formed from .020 inch thick strip stock of a stainless steel such as that known to the trade as "Type 301," fully hardened. In a large generator, on the order of 40,000 kw., for example, this spring might be approximately 1 9/16 inches wide, of which each corrugated edge portion is approximately 3/16 inch wide, and there would be approximately one and one third of the corrugations 8b per linear inch. Also, with a clearance space 9a between wedge and dovetail of approximately .031 inch and a corrugation height of approximately the spring in the uncompressed condition of .063 inch, the resilient force per linear inch exerted by the spring on the wedge 7 will be approximately 100 pounds. This force has been found to be sufficient to maintain the wedge in tight frictional engagement with the sloped surfaces 7a of rotor 1. However, considerable latitude is available in the adjustment of pitch, amplitude, thickness, and properties of the spring being used.

Thus it can be seen that my invention provides an improved spring device to resiliently maintain the slot wedge in place. This very simple spring member serves the valuable additional function of preventing extrusion of insulation between the wedges during operation of the rotor, and also serves as a chafing strip to prevent damage to the insulation during installation of the wedges. Also, the wedges can be readily removed and the spring members re-used without damage thereto.

It remains to note that this resilient wedge arrangement can be employed in dynamoelectric machine stators as well, in which case the spring wedge would normally be made of a non-conductive material to prevent "eddy-current" losses. I desire it to be understood, therefore, that my invention is not limited to the particular arrangement disclosed and I intend in the appended claims to cover all modifications which do not depart from the true spirit and scope of my invention.

What I claim as new and desire to secure by Letters Patent of the United States is:

1. In an electro-magnetic device, a core member having a plurality of slots, each slot comprising a winding receiving portion and a dovetail wedge receiving portion wider than the winding receiving slot portion, an insulated conductor disposed in the winding receiving slot portion, wedge means disposed in the wedge receiving slot portion to maintain the conductor in the winding receiving slot portion, the wedge being slightly smaller than the wedge receiving slot portion to define a longitudinal clearance space between the wedge and the conductor, spring means disposed in said clearance space to resiliently maintain the wedge means in place, said spring means comprising a strip member having a flat central portion of substantially the same width as the winding receiving slot portion disposed between the conductor and the wedge means, said strip member having corrugated side portions extending the length of the strip and disposed in the longitudinally extending side portions of said clearance space at the opposite sides of the wedge receiving slot portion, said corrugations having a greater free radial height than said clearance space whereby they are deflected upon insertion of the wedge to resiliently bias the wedge into tight frictional engagement in the wedge receiving slot portion.

2. An electric machine having a core portion defining a plurality of winding slots, a winding arranged in each slot, means for holding the winding in the slot comprising a plurality of dovetail wedges fitting in a dovetail receiving portion defined by the slot, the wedges having dovetailing tapered side faces which are in alignment with cooperating tapered faces of the dovetail receiving portion of the slot, spring means disposed in the dovetail receiving slot between the winding and wedges for biasing the wedges into positive contact with said tapered side faces, the spring means extending the axial length of the core portion and including an integral strip member between the winding and associated wedge, and corrugated side portions located in the dovetail receiving portions beneath the cooperating tapered faces, which corrugations are deflected to bias the wedge into tight frictional engagement in the dovetail receiving slot to prevent rattling of the wedges.

3. In a dynamoelectric machine having a rotor member defining axially extending slots each having a winding receiving portion and a dovetail wedge receiving portion wider than the winding receiving slot portion, an insulated conductor disposed in the winding receiving slot portion, means for holding the winding in the winding receiving slot portion comprising for each slot a plurality of dovetail wedges located end to end in the wedge receiving slot portion, the wedges being slightly smaller than the wedge receiving portion to define a longitudinal clearance space between the wedge and rotor portion defining the wedge receiving slot, spring means disposed in the clearance space to resiliently maintain the wedges in place, the spring means comprising a strip member having a flat central portion of substantially the same width as the winding receiving slot portion disposed between the conductor and wedges and extending the full axial length of the rotor to prevent extrusion of the conductor insulation between the wedges during rotation of the rotor, and corrugated side portions extending the full length of the strip and disposed in the longitudinally extending side portions of said clearance space at the opposite sides of the wedge receiving slot portion, said corrugations having a greater free radial height than said clearance space, whereby they are deflected upon insertion of the wedge to resiliently bias the wedge into tight frictional engagement in the wedge receiving portion of the core slots.

4. In an electro-magnetic core member having a wedge receiving slot, wedge means disposed in the slot and being slightly smaller than the slot to define a longitudinal clearance space between the wedge and core member, the improvement comprising a spring means for resiliently maintaining the wedge means in place which consists of a strip member having a flat central portion and corrugated side portions extending the length of the strip, the corrugated side portions having a greater free radial height than the clearance space whereby they are deflected upon insertion of the wedge to resiliently bias the wedge into tight frictional engagement in the wedge receiving slot portion.

5. A spring means for resiliently maintaining in place the wedge means of an electro-magnetic machine comprising a thin longitudinally extending strip member having a flat central portion and corrugated side portions extending the length of the strip and less than one-fifth of the width in from each side, the corrugated side portions being deflected by the wedge means to exert a biasing force against the wedge to maintain it against displacement relative to the core member.

References Cited in the file of this patent

UNITED STATES PATENTS

| 2,745,030 | Baldwin | May 8, 1956 |

FOREIGN PATENTS

| 220,755 | Great Britain | Aug. 28, 1924 |
| 758,964 | Great Britain | Oct. 10, 1956 |